(12) United States Patent
Böttcher et al.

(10) Patent No.: US 8,720,858 B2
(45) Date of Patent: May 13, 2014

(54) SINGLE USE, DISPOSABLE DIAPHRAGM VALVE IN WHICH THE VALVE BODY AND SEALING MEMBRANE ARE WELDED TO ONE ANOTHER

(75) Inventors: Lars Böttcher, Melsungen (DE); Jan Schäfer, Edermünde (DE); Kai-Uwe Wolpert, Krautheim (DE); Jürgen Mayer, Schwäbisch Hall (DE)

(73) Assignees: Sartorius StedimBioteen GmbH, Goettingen (DE); Gemue Gebr. Mueller Apparatelbau GmbH & Co. KG, Ingelfingen (DE)

( * ) Notice: Subject to any disclaimer, the term of this patent is extended or adjusted under 35 U.S.C. 154(b) by 15 days.

(21) Appl. No.: 13/062,308

(22) PCT Filed: Sep. 2, 2009

(86) PCT No.: PCT/EP2009/006358
§ 371 (c)(1),
(2), (4) Date: Apr. 8, 2011

(87) PCT Pub. No.: WO2010/025905
PCT Pub. Date: Mar. 11, 2010

(65) Prior Publication Data
US 2012/0097880 A1    Apr. 26, 2012

(30) Foreign Application Priority Data
Sep. 5, 2008   (DE) .................. 10 2008 045 857

(51) Int. Cl.
*F16K 7/12*    (2006.01)

(52) U.S. Cl.
USPC ........................................ 251/331

(58) Field of Classification Search
USPC ....................... 251/331, 335.2, 368
See application file for complete search history.

(56) References Cited

U.S. PATENT DOCUMENTS

| 2,725,211 | A | * | 11/1955 | Boteler ........................ 251/77 |
| 3,148,861 | A | * | 9/1964 | McFarland, Jr. ............. 251/331 |
| 3,154,286 | A |   | 10/1964 | McFarland et al. |
| 3,174,717 | A |   | 3/1965 | Geddes et al. |
| 3,349,795 | A | * | 10/1967 | Matsutani .................... 251/331 |
| 3,631,882 | A | * | 1/1972 | White, Jr. .................... 137/312 |

(Continued)

FOREIGN PATENT DOCUMENTS

DE         753 C      8/1877
DE      4444782 A1    6/1996

(Continued)

OTHER PUBLICATIONS

International Search Report dated Jan. 22, 2010.

*Primary Examiner* — John Bastianelli
(74) *Attorney, Agent, or Firm* — Cohen & Hildebrand, PLLC

(57) ABSTRACT

Diaphragm valve having a valve body with an inlet and an outlet, a sealing membrane, and a connecting piece connecting the sealing membrane to a pressure piece of a drive. The valve body, the sealing membrane and the connecting piece are rigidly connected together to form an interchangeable, sealed valve body unit that can be connected to the drive. The connecting piece is molded on the sealing membrane, and the valve body and the sealing membrane are welded ultrasonically to one another.

8 Claims, 4 Drawing Sheets

(56) References Cited

U.S. PATENT DOCUMENTS

Figure 1:
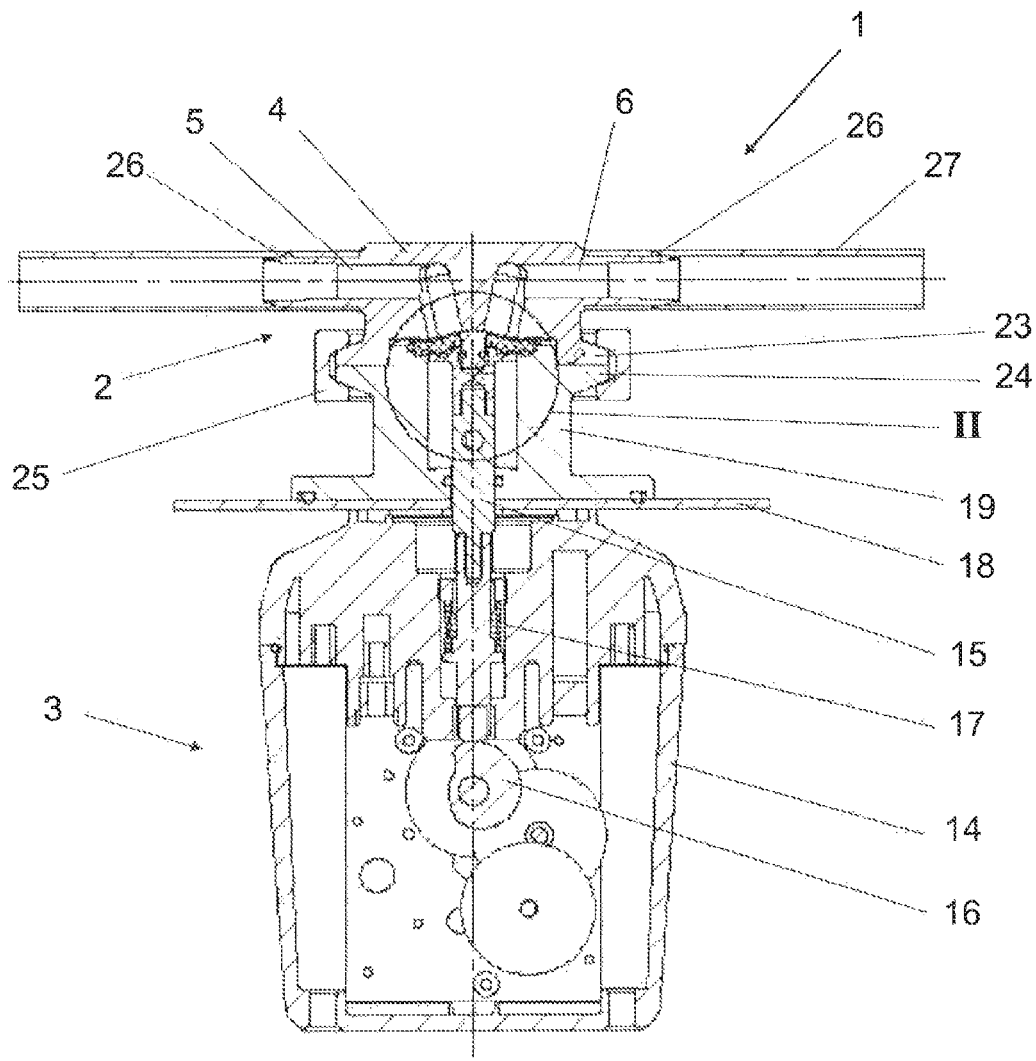

| | | | |
|---|---|---|---|
| 4,505,451 A * | 3/1985 | Jonas | 251/331 |
| 4,537,387 A * | 8/1985 | Danby et al. | 251/331 |
| 4,545,565 A * | 10/1985 | Sano et al. | 251/331 |
| 5,088,520 A * | 2/1992 | Haynes et al. | 137/270 |
| 5,288,052 A * | 2/1994 | Black et al. | 251/30.01 |
| 5,377,956 A * | 1/1995 | Muller | 251/331 |
| 5,758,864 A | 6/1998 | Asai | |
| 6,416,038 B1 * | 7/2002 | Sindel et al. | 251/331 |
| 6,505,814 B1 * | 1/2003 | Satou et al. | 251/331 |
| 6,508,266 B2 * | 1/2003 | Iritani et al. | 251/331 |
| 6,575,431 B2 * | 6/2003 | Artsvelyan | 251/331 |
| 6,789,781 B2 * | 9/2004 | Johnson et al. | 251/291 |
| 2001/0025654 A1 | 10/2001 | Iritani et al. | |
| 2006/0174949 A1 | 8/2006 | Muller | |
| 2006/0289825 A1 * | 12/2006 | Wincek | 251/331 |
| 2009/0242818 A1 * | 10/2009 | Leys et al. | 251/321 |

FOREIGN PATENT DOCUMENTS

| | | |
|---|---|---|
| DE | 19746763 A1 | 5/1999 |
| DE | 10238585 B3 | 4/2004 |
| DE | 60112639 T2 | 5/2006 |
| DE | 202005002152 U1 | 7/2006 |
| WO | WO 2007/081702 A2 * | 7/2007 |

* cited by examiner

SINGLE USE, DISPOSABLE DIAPHRAGM VALVE IN WHICH THE VALVE BODY AND SEALING MEMBRANE ARE WELDED TO ONE ANOTHER

BACKGROUND OF THE INVENTION (1) Field of the Invention

The invention relates to a diaphragm valve having a valve body comprising an inlet and an outlet, further having a sealing membrane, and a connecting piece connecting the sealing membrane to a pressure piece of a drive.

(2) Description of Related Art

Diaphragm valves having a valve body comprising an inlet and an outlet are known in the prior art from DE 601 12 639 T2 and DE 20 2005 002 152 U1. The valve bodies further have a valve seat sealed by a sealing membrane, wherein the sealing membrane is connected via a connecting piece to the pressure piece of a drive. The membranes known in the prior art are of double-layer construction.

It is known in the prior art from DE 601 12 639 T2 that the layer facing the valve body is designed as a thin surface-side membrane made of resin containing fluorine and that the second layer is designed as a rear-surface-side membrane which consists of rubber laminated onto the rear side of the surface-side membrane. The connecting piece is an insert that is connected with a positive fit to the thin sealing, or surface-side, membrane.

A disadvantage of this design is that the membrane is fixed by clamps between the valve body and a connection flange of the drive. This means that the process side of the valve can become contaminated during assembly. Similarly, process fluid can unwantedly escape and contaminate the environment during disassembly.

A diaphragm valve is known in the prior art from DE 44 44 782 A1 in which a membrane is fixed between a first housing part and a second housing part designed as a valve body, said membrane being welded ultrasonically to the two housing parts. The membrane is connected directly to a sealing element, via which the valve seat can be sealed. Using a pilot valve, compressed air can be applied to the membrane on the side facing away from the fluid chamber. In the process the membrane with the sealing element is pressed against the force of a return spring arranged on the fluid side and against the valve seat.

A disadvantage of this design is that the housing cannot be disassembled and is not suited to be used as a disposable valve.

Finally, fluid modules designed as micropumps or microvalves are known in the prior art from DE 102 38 585 B3. It is possible to realize as separate elements a fluid part composed of the fluid module and an actuator part to actuate the fluid part, however these are miniaturized one-piece basic elements, the fluid chamber of which can be covered by a planar membrane, which because of the small spacing relative to the valve seat is movable via an actuator designed as a piezo element acting on one side, i.e. the membrane does not have to be rigidly connected to the actuator.

A disadvantage of this design is that fluid modules of this type cannot easily be scaled up and, because of their small flow cross-section, are therefore not suitable for one-time use as valves in tubing systems of filtration systems or bioreactors and tubing systems connected thereto.

A so-called thumb cock designed as a diaphragm valve is known in the prior art from DE 753 C. The diaphragm valve has a valve body with an inlet and an outlet as well as a sealing membrane and a connecting piece connecting the sealing membrane to a pressure piece. The valve body, the sealing membrane, the connecting piece and the drive, and an eccentric disk arranged on a flange, and provided with a thumbpiece or lever, are connected together by screws to form a sealed valve.

A disadvantage of this design is that the membrane is fixed by clamps and screws between the valve body and the flange of the drive. This means that the process side of the valve can become contaminated during assembly. Similarly, process fluid can unwantedly escape and contaminate the environment during disassembly.

Furthermore, a membrane-controlled pressure-regulating valve for fuel control is known in the prior art from DE 197 46 763 A 1, said valve having a housing in which an elastic membrane is fixed by means of a flanged connection between the upper and lower parts of the housing, which form a valve body. The membrane may additionally be welded ultrasonically to the upper or lower housing part. A pressure-regulating spring is located in the upper housing part and presses against a diaphragm disk of the membrane.

A disadvantage of this design is that, on the one hand, the pressure-regulating valve does not have an interchangeable valve body unit and, on the other hand, it cannot be connected to a drive.

BRIEF SUMMARY OF THE INVENTION

The object of the present invention is, therefore, to improve the diaphragm valves known in the art in such a way that they can be integrated into single-use tubing systems or disposable presterilizable filtration systems and so that they can be manufactured economically.

This object is solved in connection with the preamble of claim 1 in that the valve body, the sealing membrane and the connecting piece are rigidly connected together to form an interchangeable, sealed valve body that can be connected to the drive; that the connecting piece is molded on the sealing membrane; and that the valve body and the sealing membrane are welded ultrasonically to one another.

Through the rigid connection of the valve body, sealing membrane and connecting piece to form a sealed valve body unit, it is possible to design the valve body unit as a disposable unit and to integrate the diaphragm valve into a single-use tubing system or presterilizable filtration system. In this way, the valve body unit can be economically designed as a disposable or single-use valve body unit and can be coupled or connected to a reusable drive. Through the rigid connection of the sealing membrane and valve body, the valve body unit is sealed and contamination of the fluid chamber and of the environment is avoided. As a result of the rigid connection of the connecting piece to the sealing membrane, the sealing membrane can not only be pushed into the closed position but also pulled into the open position so that the fluid chamber in the valve body can encompass a relatively large volume and a sufficient volumetric flow can thus be achieved for the tubing systems in filtration systems. The fact that the connecting piece is molded on the sealing membrane and that the valve body and the sealing membrane are welded ultrasonically to one another contributes to the simple and economical manufacture of the valve body unit.

According to another preferred embodiment of the invention, the sealing membrane and the valve body are made of plastic. On the one hand, this allows for the disposal of the single-use item and, on the other hand, it makes it possible to economically weld the valve body and sealing membrane to one another ultrasonically.

According to one preferred embodiment of the invention, the sealing membrane and the valve body are made of polyethylene (PE).

According to another preferred embodiment of the invention, on the drive side a pressure-transmitting diaphragm is located in front of the pressure piece, in the direction of the sealing membrane. When the valve body unit is attached to the drive, said pressure-transmitting diaphragm is in contact with the sealing membrane. In this case, during disassembly of the valve body unit, the pressure-transmitting diaphragm can remain on the drive or on the pressure piece of the drive, while only the sealing membrane, which is rigidly connected to the valve body, is disposed of as part of the valve body unit.

According to another preferred embodiment of the invention, the pressure-transmitting diaphragm is made of a synthetic material. The preferred material for the pressure-transmitting diaphragm is an ethylene propylene diene monomer rubber. The pressure-transmitting diaphragm serves, on the one hand, to protect the sealing membrane and, on the other hand, the force to be introduced can be directionally applied by the pressure piece to the membrane.

According to another preferred embodiment of the invention, the drive has an intermediate piece oriented toward the valve body unit, the free end of which can be connected to a free end of the valve body unit. On the one hand, the intermediate piece may be used, for instance, to attach the drive to a metal wall of a switching cabinet. On the other hand, the free end of the intermediate piece facing away from the drive may serve as the connection to a corresponding free end of the valve body unit. The free ends are preferably designed as connecting flanges which are connected together via a fixing clamp or so-called Tri-Clamp. In principle, the connection can also be made using a coupling nut, screw connection, bayonet fastening, etc.

According to another preferred embodiment of the invention, the pressure piece is connected to a valve spindle of the drive, and the pressure piece and the connecting piece are designed to lock together so that the valve body unit can be connected to the drive without using tools. The unlockable connection between, on the one hand, the valve body and the intermediate piece and, on the other hand, between the connecting piece and the pressure piece, allows the valve body unit to be easily replaced without having to expose the process chamber to the environment. Cleaning the valve body unit is not necessary, as it is disposed of after use.

According to another preferred embodiment of the invention, the connecting piece with the valve body unit and the pressure piece with the drive can be aligned axially by rotating them relative to each other and they can be attached via the fixing clamp.

According to another preferred embodiment of the invention, the valve body unit is designed for one-time use, thus making it suitable for integration into presterilizable tubing systems or filtration systems.

According to another preferred embodiment of the invention, the membrane is designed to be convex in at least one plane in the area of the connecting piece, and the valve body is designed to be appropriately concave in its corresponding area. A relatively large valve chamber volume is achieved as a result of the curvature of the sealing membrane in its closed position and of an opposing curvature in its open position. Furthermore, a favorable distribution of force is achieved between the sealing membrane and the valve seat of the valve body; at the same time, sharp bends and severe stresses on the sealing membrane are avoided at the rim of the valve seat.

By placing a sensor or micro switch in the intermediate piece, it is possible to detect the correct connection between the valve body and intermediate piece.

Additional details regarding the invention can be found in the following, extensive description and the attached drawings, in which preferred embodiments of the invention are illustrated as examples.

BRIEF DESCRIPTION OF THE SEVERAL VIEWS OF THE DRAWING(S)

Figure 2:
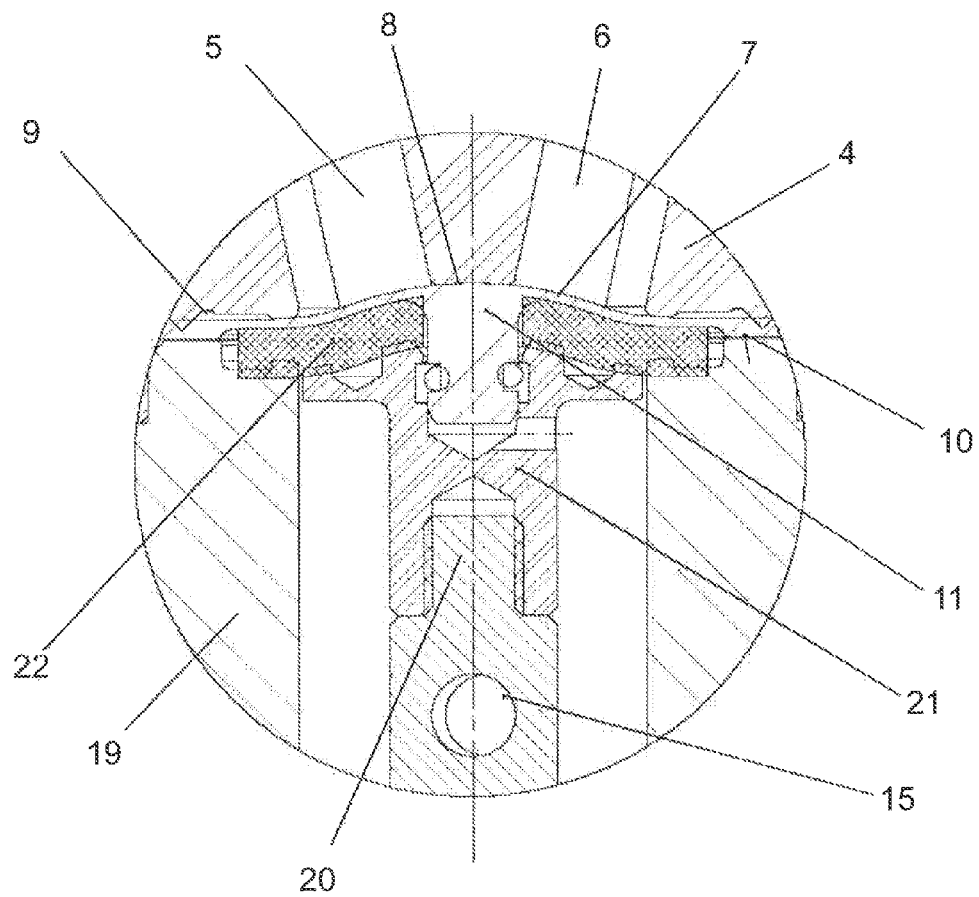
Figure 3:
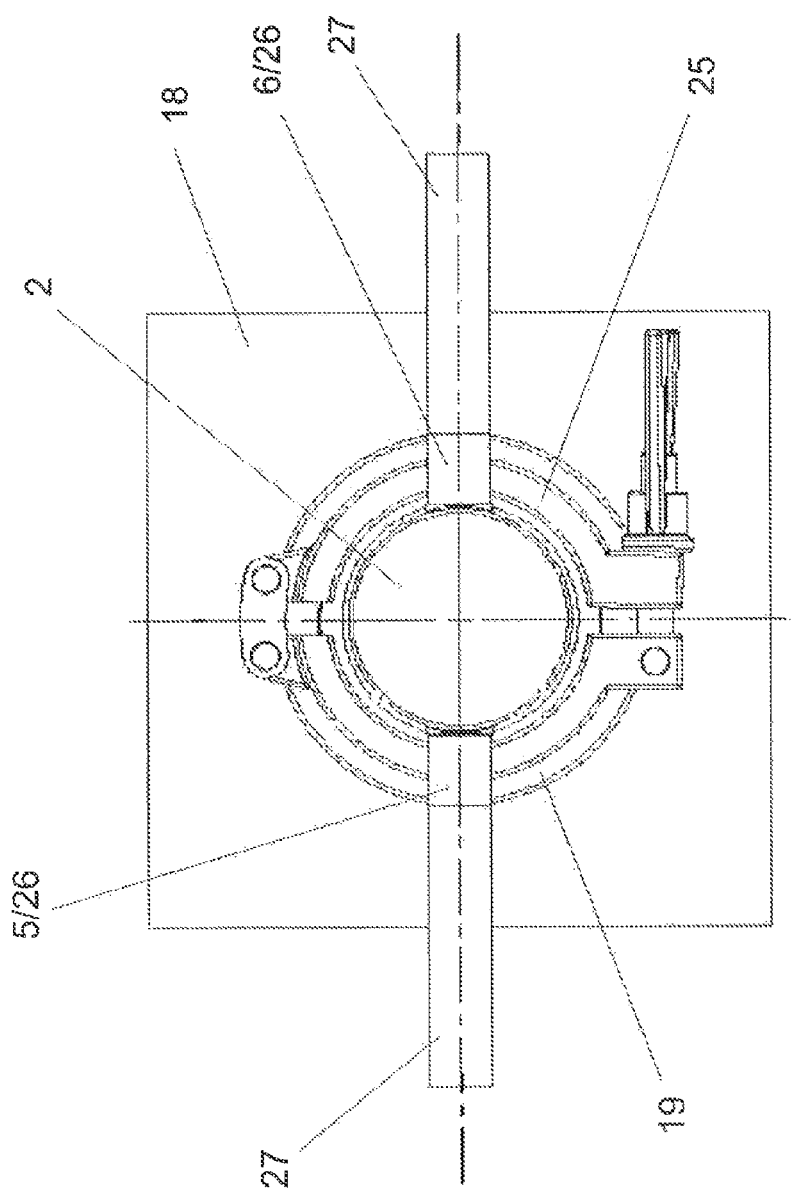
Figure 4:
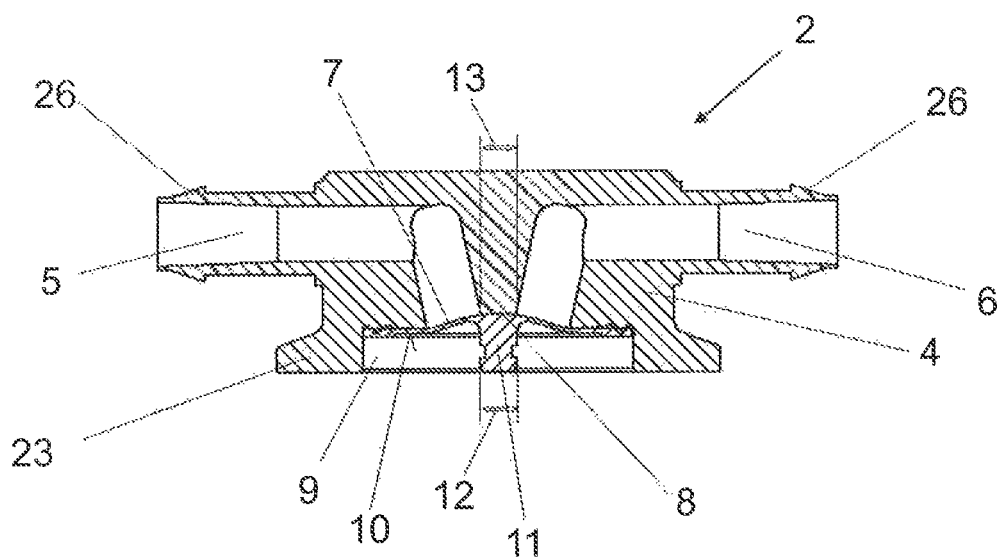
Figure 5:
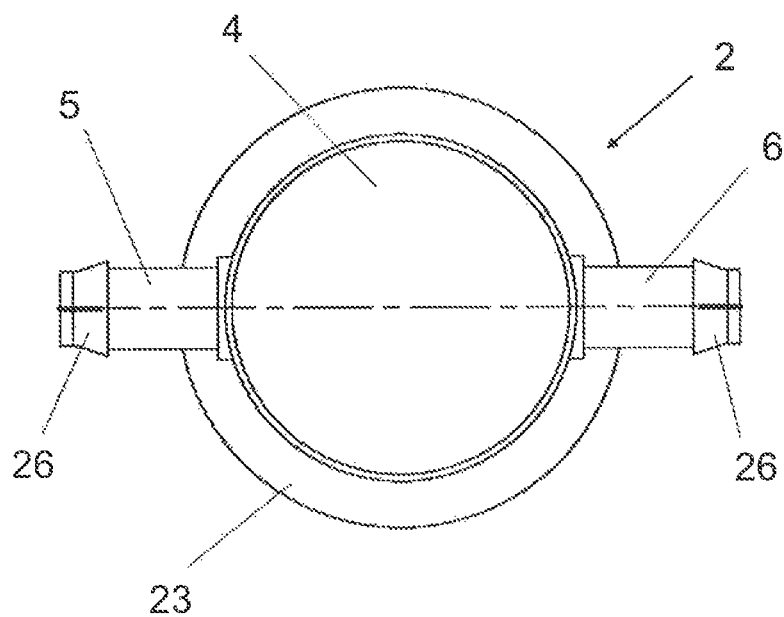

Depicted in the drawings are:
FIG. 1: a cross-sectional side view of a diaphragm valve,
FIG. 2: an enlarged depiction of detail II of FIG. 1,
FIG. 3: a top view of the diaphragm valve of FIG. 1,
FIG. 4: a cross-sectional side view of a valve body unit, and
FIG. 5: a top view of the valve body unit of FIG. 4.

DETAILED DESCRIPTION OF THE INVENTION

A diaphragm valve 1 consists, in essence, of a valve body unit 2, which is particularly suitable for use as a disposable item, and a reusable drive 3.

The valve body unit 2 consists of a valve body 4 with an inlet 5 and an outlet 6, which open into a valve chamber defined between the valve body 4 and a sealing membrane 7, wherein the connection between the inlet 5 and the outlet 6 is interrupted by pressing the sealing membrane 7 against a valve seat (8). The sealing membrane 7 is located in a shoulder 9 of the valve body 4 located in front of the valve seat 8 and seals off the valve body 4 from the drive 3 and the environment. Both the valve body 2 and the sealing membrane 7 are made of polyethylene (PE) in the exemplary embodiment. On its rear side 10, which faces away from the valve body 4, the sealing membrane 7 has a connecting piece centrally formed on the sealing membrane 7. The connecting piece 11 has a diameter 12 that is somewhat larger than the width 13 of the valve seat 8 formed between the inlet 5 and the outlet 6. The sealing membrane 7 is convex facing the valve seat 8 and in particular in the fixed, relatively rigid area of the connecting piece 11, and the corresponding valve seat 8 is appropriately concave facing the sealing membrane 7. The sealing membrane 7 and the valve body 4 are welded to one another ultrasonically in a liquid-tight and gas-tight manner.

The drive 3 consists, in essence, of a cup-shaped housing 14 with a valve spindle 15 that can be displaced along its longitudinal axis, and which is moved by a motor-driven cam disk 16 in opposition to the force of a pressure spring 17. The housing 14 can be positioned from inside against the metal wall 18 of a switching cabinet and can be attached from outside via an intermediate piece 19. A pressure piece 21 is screwed onto the end 20 of the valve spindle 15 facing away from the cam disk 16 of the drive 3. Said pressure piece is designed to lock and unlock with the connecting piece 11 of the valve body unit 2 and the sealing membrane 7. At its end facing towards the sealing membrane 7, the pressure piece 21 is equipped with a pressure-transmitting diaphragm 22, which is located—or more precisely, clamped—between the sealing membrane 7 and the pressure piece 21 when the valve body unit 2 is connected to the drive 3. The pressure-transmitting diaphragm 22 in the exemplary embodiment is made of an ethylene propylene diene monomer (EPDM) rubber. The pressure-transmitting diaphragm 22 protects the sealing membrane 7 and applies the force from the pressure piece 21 to the sealing membrane 7.

The valve body 4 has a connection flange 23 mounted facing the drive 3. Said connection flange is set against a corresponding connection flange 24 of the intermediate piece 19. The two connection flanges 23, 24 are connected to each other via a fixing clamp 25.

The inlet 5 and the outlet 6 in the exemplary embodiment have barbs 26, which are connected to corresponding tubes 27.

For mounting, the valve body unit 2 with its connection tubes 27 is removed from sterile packaging (not shown) and fitted on the drive 3 so that the connecting piece 11 and the pressure piece 21 interlock with one another. After aligning the valve body unit 2 with the drive 3, the connection flanges 23, 24 are connected together via the fixing clamp 25 so that the valve body unit 2 is fixed to the drive 3.

After use, the fixing clamp 25 is loosened and the valve body unit 2 is removed from the drive 3 and disposed of.

The invention claimed is:

1. A diaphragm valve (1) having a valve body (4) comprising:
    an inlet (5) and an outlet (6),
    a sealing membrane (7), and
    a connecting piece (11) connecting the sealing membrane (7) to a pressure piece (21) of drive (3),
    wherein the valve body (4), the sealing membrane (7) and the connecting piece (11) are rigidly connected together to form an interchangeable, sealed valve body unit (2) connectable to the drive (3),
    wherein the valve body unit (2) is for one time use and disposable,
wherein the connecting piece (11) is molded on the sealing membrane (7), and
wherein the valve body (4) and the sealing membrane (7) are welded ultrasonically to one another,
    wherein a diameter of the connecting piece (11) is larger than a width of a valve seat (8) formed between the inlet (5) and the outlet (6),
    wherein the sealing membrane (7) is designed to be convex along an entire interface with the connecting piece (11), and the valve body (4) is designed to be correspondingly concave in a corresponding area;
    wherein on the drive side a pressure-transmitting diaphragm (22) oriented towards the sealing membrane (7) is located in front of the pressure piece (21), said pressure-transmitting diaphragm being in contact with the sealing membrane (7) when the valve body unit (2) is attached to the drive (3); and
    wherein the connecting piece passes through to the other side of the diaphragm where the connecting piece connects to the pressure piece.

2. The diaphragm valve according to claim 1, wherein the sealing membrane (7) and the valve body (4) are made of plastic 3. The diaphragm valve according to claim 2, wherein the sealing membrane (7) and the valve body (4) are made of polyethylene.

4. The diaphragm valve according to claim 1, wherein the pressure-transmitting diaphragm (22) is made of a synthetic material.

5. The diaphragm valve according to claim 4, wherein the pressure-transmitting diaphragm (22) is made of an ethylene propylene diene monomer rubber.

6. The diaphragm valve according to claim 1, wherein the drive (3) has an intermediate piece (19) oriented towards the valve body unit (2), the free end of which can be connected to a free end of the valve body unit (2).

7. The diaphragm valve according to claim 6, wherein the free ends are designed as connecting flanges (23, 24) and are connected together via a fixing clamp (25).

8. The diaphragm valve according to claim 1, wherein the pressure piece (21) is connected to a valve spindle (15) of the drive (3), and the pressure piece (21) and the connecting piece (11) are designed to lock together.

\* \* \* \* \*

UNITED STATES PATENT AND TRADEMARK OFFICE
CERTIFICATE OF CORRECTION

| | | |
|---|---|---|
| PATENT NO. | : 8,720,858 B2 | Page 1 of 1 |
| APPLICATION NO. | : 13/062308 | |
| DATED | : May 13, 2014 | |
| INVENTOR(S) | : Lars Bottcher et al. | |

It is certified that error appears in the above-identified patent and that said Letters Patent is hereby corrected as shown below:

On the Title Page Item [73] should read:
        -- Sartorius Stedim Biotech GmbH, Goettingen (DE);
        Gemue Gebr. Mueller Apparatebau GmbH & Co. KG, Ingelfingen (DE) --

Signed and Sealed this
Eighteenth Day of November, 2014

Michelle K. Lee
*Deputy Director of the United States Patent and Trademark Office*